(12) United States Patent
Strieber

(10) Patent No.: US 7,213,931 B2
(45) Date of Patent: May 8, 2007

(54) METHOD FOR REFLECTING RADIATION EMANATING FROM A SOURCE

(76) Inventor: Louis Charles Strieber, PMB 336, 6800 W. Gate Blvd., Suite 132, Austin, TX (US) 78745-4868

( * ) Notice: Subject to any disclaimer, the term of this patent is extended or adjusted under 35 U.S.C. 154(b) by 0 days.

(21) Appl. No.: 11/126,659

(22) Filed: May 10, 2005

(65) Prior Publication Data

US 2006/0012896 A1    Jan. 19, 2006

Related U.S. Application Data

(63) Continuation of application No. 10/226,783, filed on Aug. 23, 2002, now abandoned, which is a continuation-in-part of application No. 09/721,235, filed on Nov. 22, 2000, now abandoned.

(51) Int. Cl.
*G02B 5/08* (2006.01)

(52) U.S. Cl. .................. 359/853; 126/696

(58) Field of Classification Search ........ 359/850–853; 126/684, 688, 696
See application file for complete search history.

(56) References Cited

U.S. PATENT DOCUMENTS

| | | | |
|---|---|---|---|
| 1,200,346 A * | 10/1916 | Harvey | 362/283 |
| 4,060,315 A | 11/1977 | Heinz | |
| 4,073,567 A | 2/1978 | Lakerveld et al. | |
| 4,171,876 A | 10/1979 | Wood | |
| 4,172,443 A * | 10/1979 | Sommer | 126/680 |
| 4,276,872 A * | 7/1981 | Blake et al. | 126/578 |
| 4,586,488 A * | 5/1986 | Noto | 126/578 |
| 4,714,214 A | 12/1987 | Schleimann-Jensen et al. | |
| 4,930,493 A * | 6/1990 | Sallis | 126/600 |
| 5,400,184 A | 3/1995 | Kuklo | |
| 5,668,655 A | 9/1997 | Schweizer et al. | |
| 5,979,438 A | 11/1999 | Nakamura | |
| 6,042,240 A | 3/2000 | Strieber | |

* cited by examiner

Primary Examiner—Mark A. Robinson

(57) ABSTRACT

A method for effecting solar radiation in space prior to the solar radiation reaching Earth. The method includes the steps of choosing a location between the Earth and the sun, focusing reflected solar radiation from two reflectors upon the location, monitoring solar radiation that passes through the focal location, and adjusting the reflectors to increase the size or change the shape of the focal location. The disclosure further includes a structure having a single joint for articulating the structure, where the single joint rotates the structure about a first axis in response to a first input and where the single joint rotates the structure about a second axis in response to a second input.

18 Claims, 14 Drawing Sheets

METHOD FOR REFLECTING RADIATION EMANATING FROM A SOURCE

This application is a continuation of my U.S. patent application Ser. No. 10/226,783 filed Aug. 23, 2002, now abandoned which was a continuation-in-part of my U.S. patent application Ser. No. 09/721,235 filed Nov. 22, 2000 now abandoned and claims the benefit thereof under 35 U.S.C. § 120.

The present invention relates to a method for effecting solar radiation emanating toward Earth and to a joint for pivoting a structure.

BACKGROUND OF THE INVENTION

Light may behave like a wave and, at the same time, behave like a particle. This invention subscribes to neither theory but generally this invention may be at least partially understood on the basis of the wave features of solar energy. For example, this invention "fights fire with fire." It is believed that by redirecting solar radiation to form focal hot points between the Earth and the sun, chances are increased that solar radiation passing through the focal point or focal locations may be reduced (or concentrated) or dissipated or deflected.

SUMMARY OF THE INVENTION

A feature of the present invention is a method for effecting solar radiation. The method includes the steps of providing first and second reflectors in space, choosing a location between the Earth and the sun, orienting the reflectors to focus on a focal location, monitoring whether radiation passes through or is deflected by the focal location, and adjusting the reflectors so as to change the effect of the focal location on the solar radiation.

Another feature of the present invention is to provide an array of reflectors to increase the number of focal locations and/or to increase the amount of light energy directed to one focal location.

Another feature of the present invention is to provide an array of arrays of reflectors so as to further increase the number of focal locations and/or increase the amount of light energy directed to one focal location.

Another feature of the present invention is, using an array of arrays of reflectors, the method of increasing the height, width or depth of the focal location.

Another feature of the present invention is to provide a three dimensional focal location such that solar radiation passes through a number of focal points or locations, thereby increasing the possibility of altering or redirecting or reflecting or impacting solar radiation.

Another feature of the present invention is to provide a focal location relatively close to the sun to provide a relatively large "blacked out" portion on Earth.

Another feature of the present invention is to provide a focal location relatively close to the Earth to provide a relatively small "blacked out" portion on Earth.

Another feature of the present invention is a joint that rotates a structure about a first axis and about a second axis, where a first input force for rotating the structure about the first axis is exercised at the joint and where a second input force for rotating the structure about the second axis is exercised at the same joint.

An advantage of the present invention is that solar radiation is controlled at a location in space prior to reaching the Earth.

Another advantage of the present invention is that solar radiation may be reduced.

Another advantage of the present invention is that solar radiation may be concentrated.

Another advantage of the present invention is that solar radiation may be deflected prior to reaching Earth.

Another advantage is that the reflector having the joint of the present invention minimizes the mathematical calculations needed for positioning the reflector.

DESCRIPTION

As to reflectors positioned in space, my previous U.S. Pat. No. 6,042,240 issued Mar. 28, 2000 is hereby incorporated by reference in its entirety.

Figure 1:
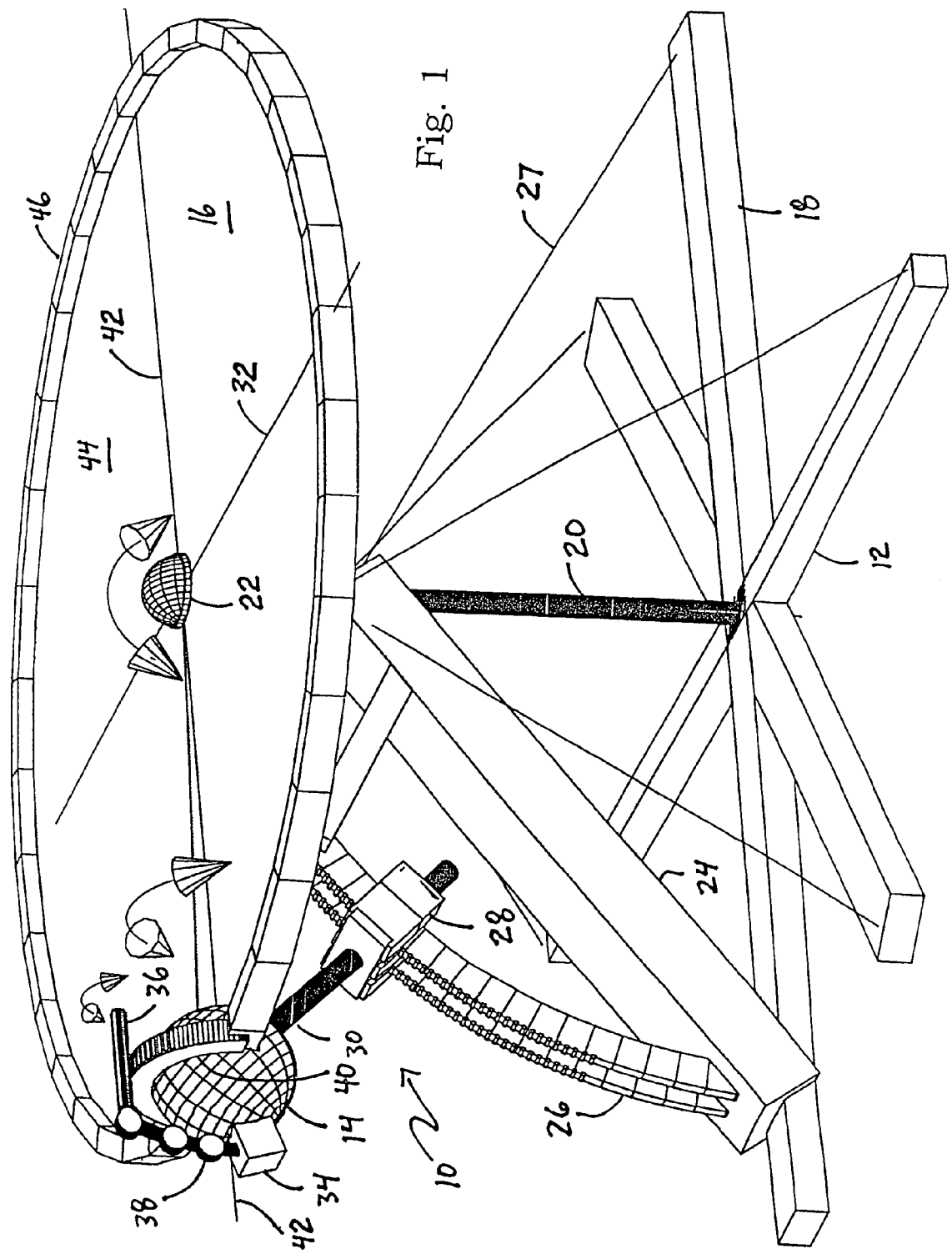
FIG. 1 is a perspective view of a reflector where the reflector includes a radiation member such as a reflecting surface, a base, and a single joint between the base and radiation member.
Figure 2:
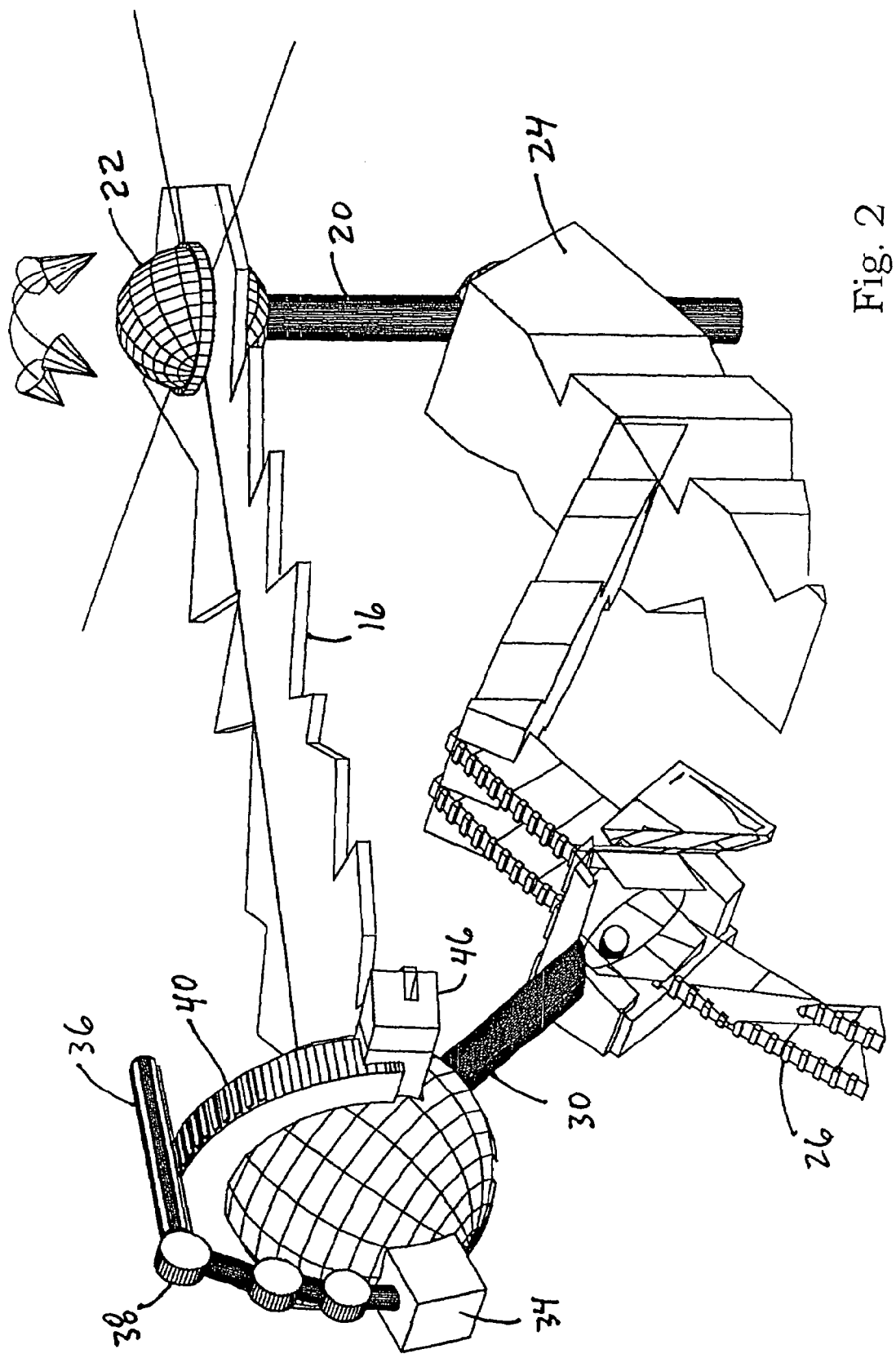
FIG. 2 is a perspective cutaway view of the reflector of FIG. 1.

FIGS. 1 and 2 show a reflector 10. The reflector 10 generally includes a base 12, a single joint 14, and a reflecting member 16. The base 12 includes a star-shaped frame 18 radiating from a central post 20. A bearing 22 is engaged on an end of the post 20. The base 12 further includes an angled support member 24 engaged between the star-shaped frame 18 and the post 20 and a semicircular or arc toothed gear 26 mounted on the angled support member 24. Guy wires 27 extend between the star-shaped form 18 and an end of the angled support member 24. A drive unit 28 cooperates with the toothed gear 26 and may be driven along the arc provided by the toothed gear 26. The drive unit 28 includes a post 30 engaged to the single joint 14. Post 30 may be adjustable in the axial direction relative to drive 28 as the drive 28 drives itself on the arc toothed gear 26. The joint 14 is rotatably coupled to the reflecting member 16 such that when the drive unit 28 is driven up and down the toothed gear 26, the reflecting member 16 rotates about axis 32. A drive unit 34 is affixed to joint 14 and includes a spinnable toothed gear 36. The spinnable toothed gear 36 may extend or retract in a linear fashion via articulating mechanism 38. Spinnable toothed gear 36 engages toothed rack 40 fixed to reflecting member 16 but relatively rotatable as to joint 14. Spinning toothed gear 36 thereby drives reflecting member 16 about axis 42. It should be noted that a center of joint 14 lies in the plane of a reflecting surface 44 on reflecting member 16 and is aligned with axis 42. The reflecting member 16 includes the reflecting surface 44 and a peripheral frame 46 about the reflecting surface 44. Rotation about axis 32 is independently controlled relative to rotation about axis 42.

Figure 3:
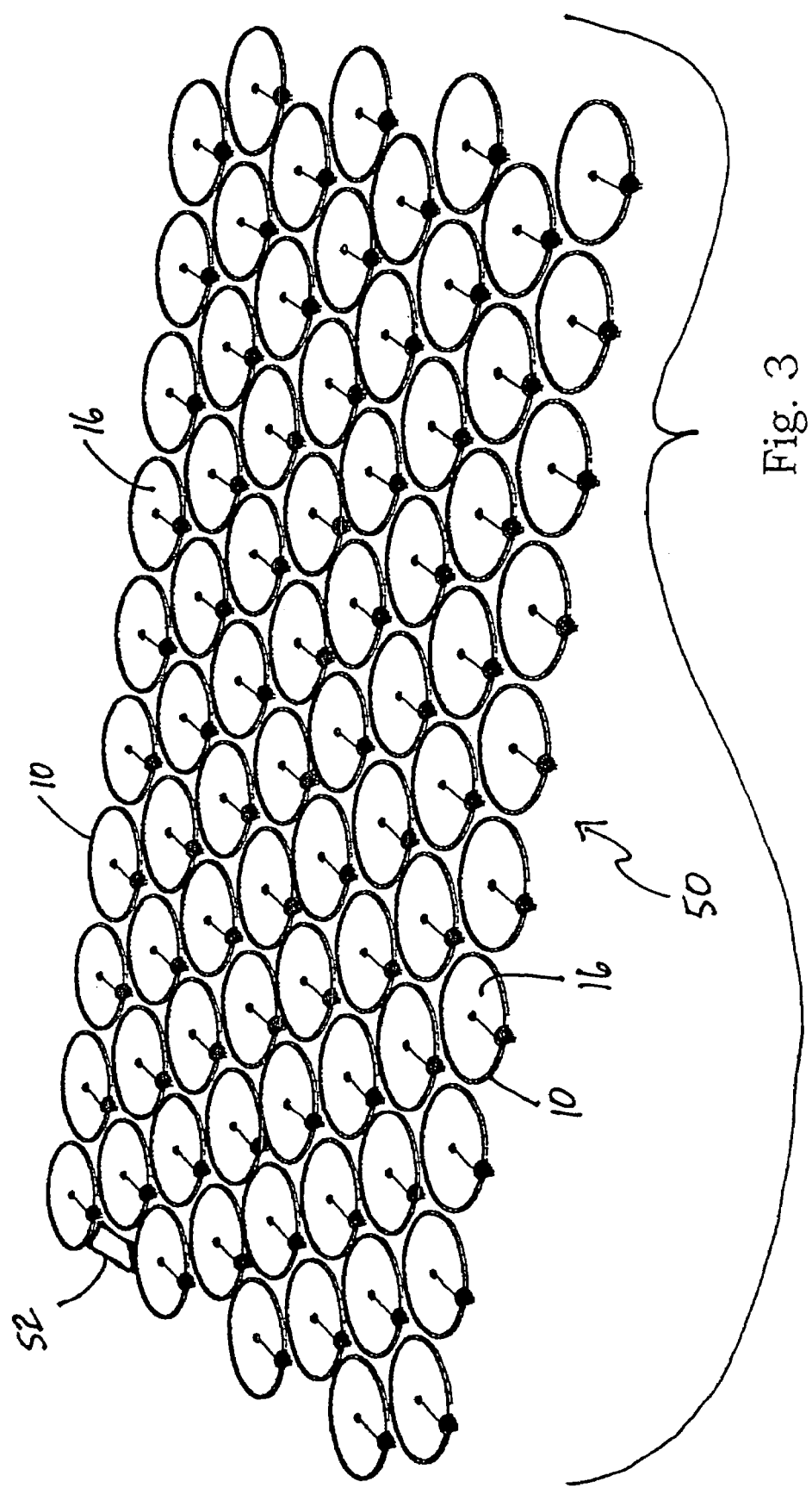
FIG. 3 shows an array of reflectors where each reflector is the reflector of FIG. 1.

FIG. 3 shows an array 50 of reflectors 10. The array 50 may include one or more gyroscopes 52. The array 50 includes 80 reflectors 10. However, an array 50 may include as little as ten reflectors 10 to as many as a hundred or a thousand reflectors 10. The reflectors 10 are positioned generally in a plane. However, if desired, the reflectors 10 may form a dish like shape. The reflectors 10 of the array 50 may be joined via the star-shaped members 18. Each of the reflectors 10 is independently controllable relative to each of the other reflectors 10.

It should also be noted that each of the reflectors 10 is manufactured to be preferably about one foot square in size. However, if desired, the reflector 10 may be sized to be 100 foot square or 1000 foot square or larger.

It should also be noted that the reflectors 10 are spaced to be preferably between about one to about 100 miles apart, more preferably between about five to about 50 miles apart, and even more preferably about five to about 20 miles apart, and most preferably about ten miles apart.

Figure 4:
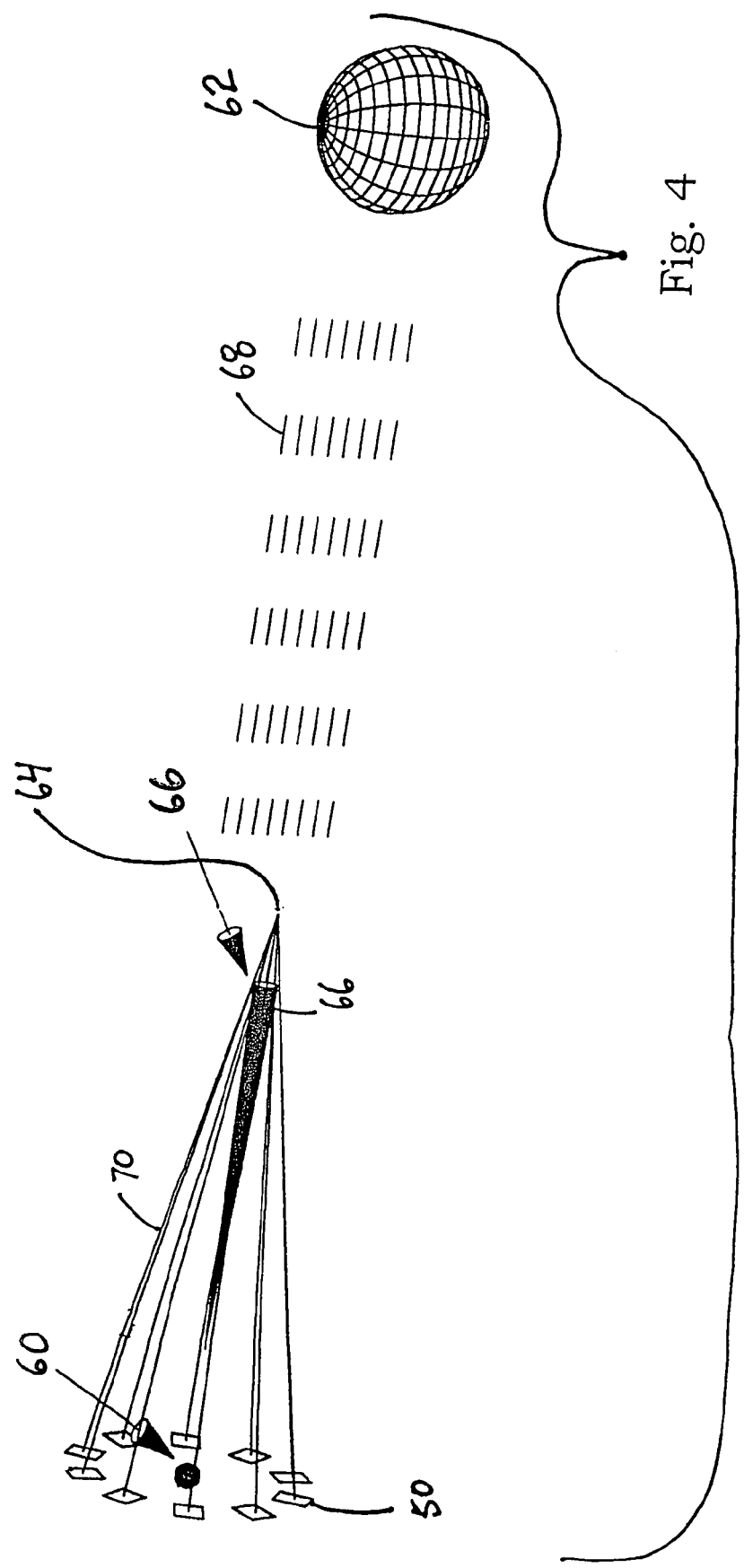
FIG. 4 is a diagrammatic view of a method of altering solar radiation where the method employs a multiple number of the reflector arrays of FIG. 3 positioned around the Earth circumferentially in space.

FIG. 4 shows the Earth 60, the sun 62 and ten arrays 50 positioned about the Earth. FIG. 4 further shows the arrays 50 reflecting solar radiation so as to focus on a focus point or focal location 64. Location 64 may have a size so that the height and/or width and/or depth of the location 64 may be about one meter to about several hundred meters to about several thousand meters. Location 64 may be formed by a plurality of focal sub-locations where each sub-location is formed by solar radiation reflected from two different first and second reflecting members 16 or where each sub-location is formed by solar radiation reflected from two different arrays 50. Further, it is believed that, where the ten arrays 50 focus on a focal location so as to focus a massive amount of light energy, that a cone shaped umbra or penumbra 66 (i.e., shadow) may be cast from the focused solar radiation (i.e., the focal location 64). This shadow may be generated by "light waves altering light waves" or by some other unknown interaction of solar radiation at the focal location 64. It should be noted that FIG. 4 further shows solar radiation or sun rays 68 and solar radiation 70 being reflected from the arrays 50 toward the focal location 64. An arrangement of arrays 50 such as shown in FIG. 4 may be used in the event of severe ozone depletion.

Figure 5:
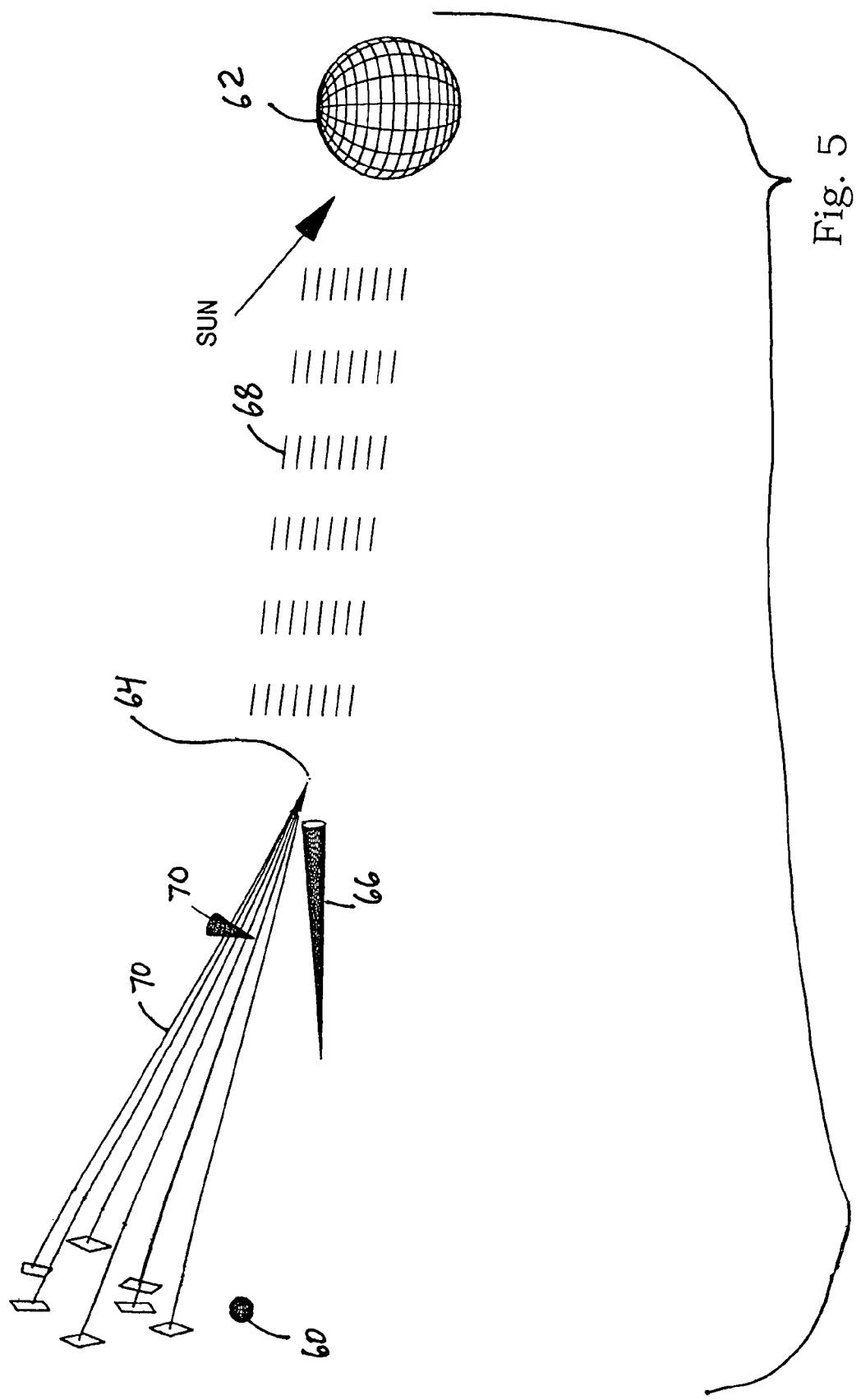
FIG. 5 is a diagrammatic view of a method of altering solar radiation where the method employs a multiple number of the reflector arrays of FIG. 3 positioned on one side of the Earth circumferentially in space.

FIG. 5 shows that positioning the arrays 50 (or individual reflectors 10) on one side of the Earth in space may cause the focal location or hot spot 64 to have a lens effect to offset solar radiation away from the Earth. Here it is believed that the umbra or penumbra 66 would be cast in an offset direction. The method shown in FIG. 5 may also be used in the event of a severe ozone depletion.

Figure 6:
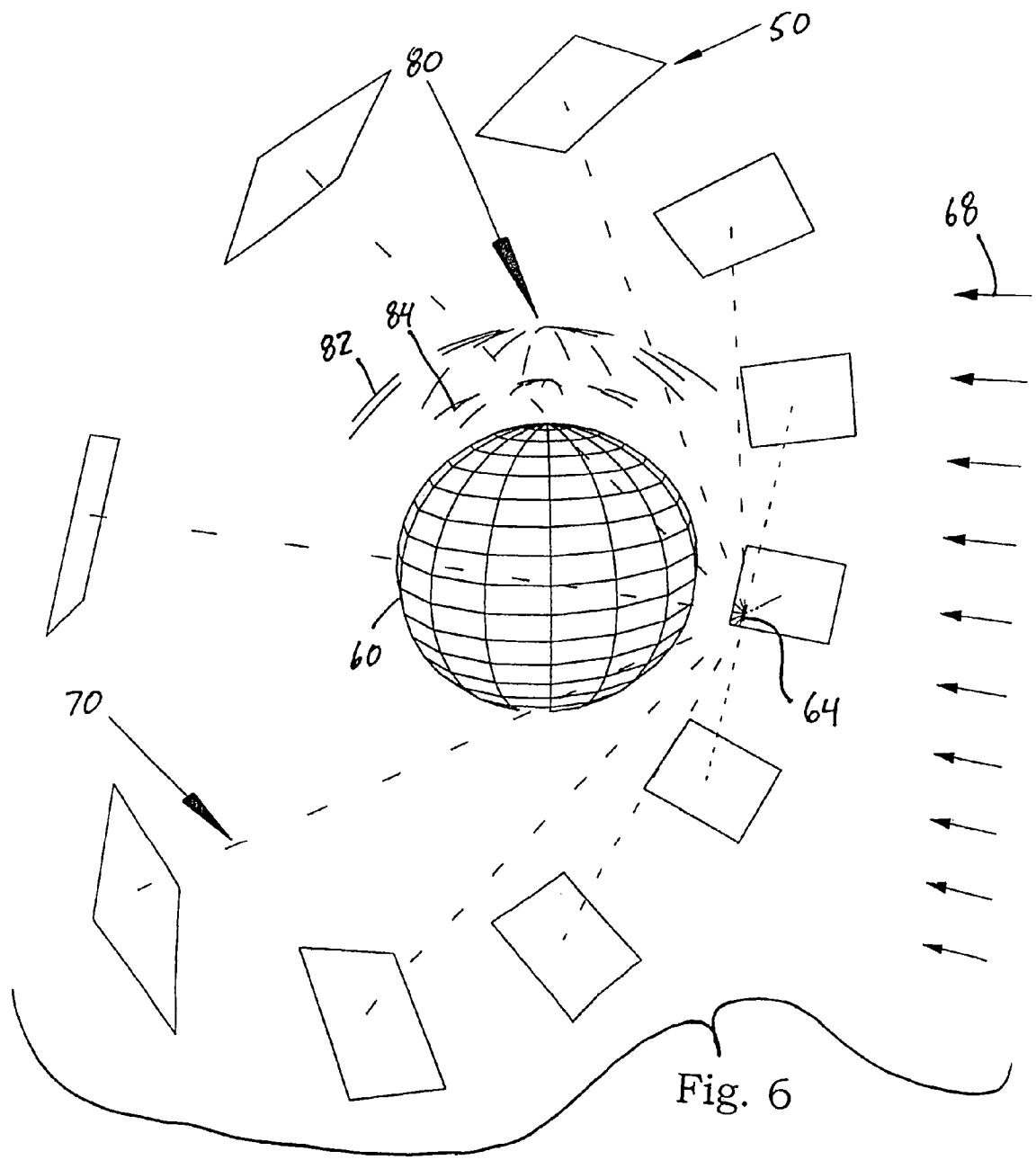
FIG. 6 is a diagrammatic view of a method of altering solar radiation where the method employs a multiple number of the reflector arrays of FIG. 3 positioned about the Earth to heat a portion of the atmosphere of Earth.

FIG. 6 shows that the arrays 50 (or individual reflectors 10) may be positioned about the Earth to orient the focal location 64 in the atmosphere 80 of the Earth to heat up a portion of the atmosphere. This focal location 64 is shown for ease of illustration which would occur only momentarily. Ideally each of the reflecting members 16 would be scanning the stratosphere to raise the average temperature. Reference number 82 indicates an outer layer of the atmosphere. Reference number 84 indicates an inner layer of the atmosphere. The arrays 50 may focus on either or both of the inner and outer atmospheres.

Figure 7:
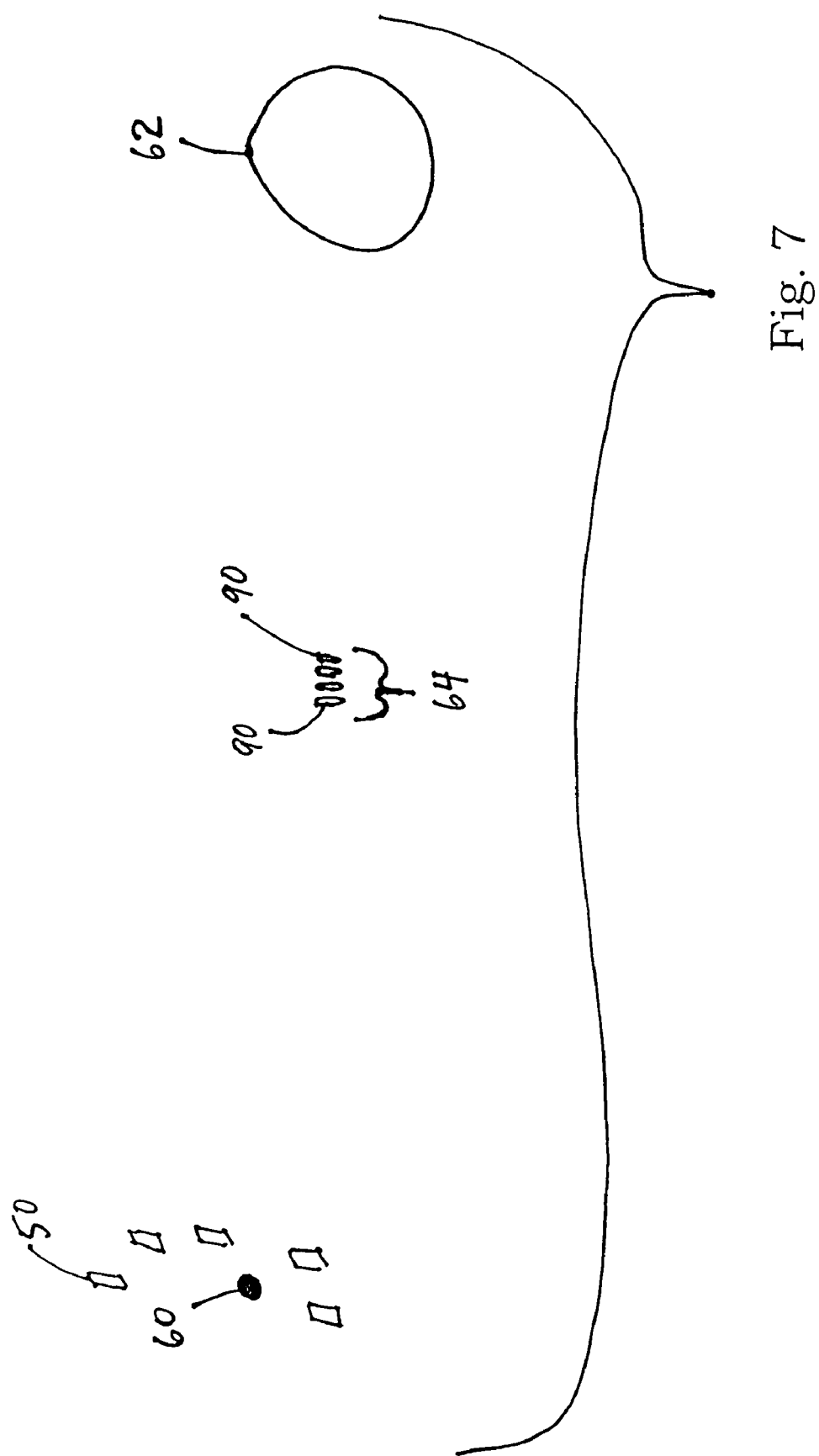
FIG. 7 is a diagrammatic view of a method for forming a focal location having depth or multiple linear hot spots.

FIG. 7 shows that the arrays 50 may form a focal location 64 having depth. In other words, the arrays 50 would focus on several sub-locations 90, one right in front of the other.

Figure 8:
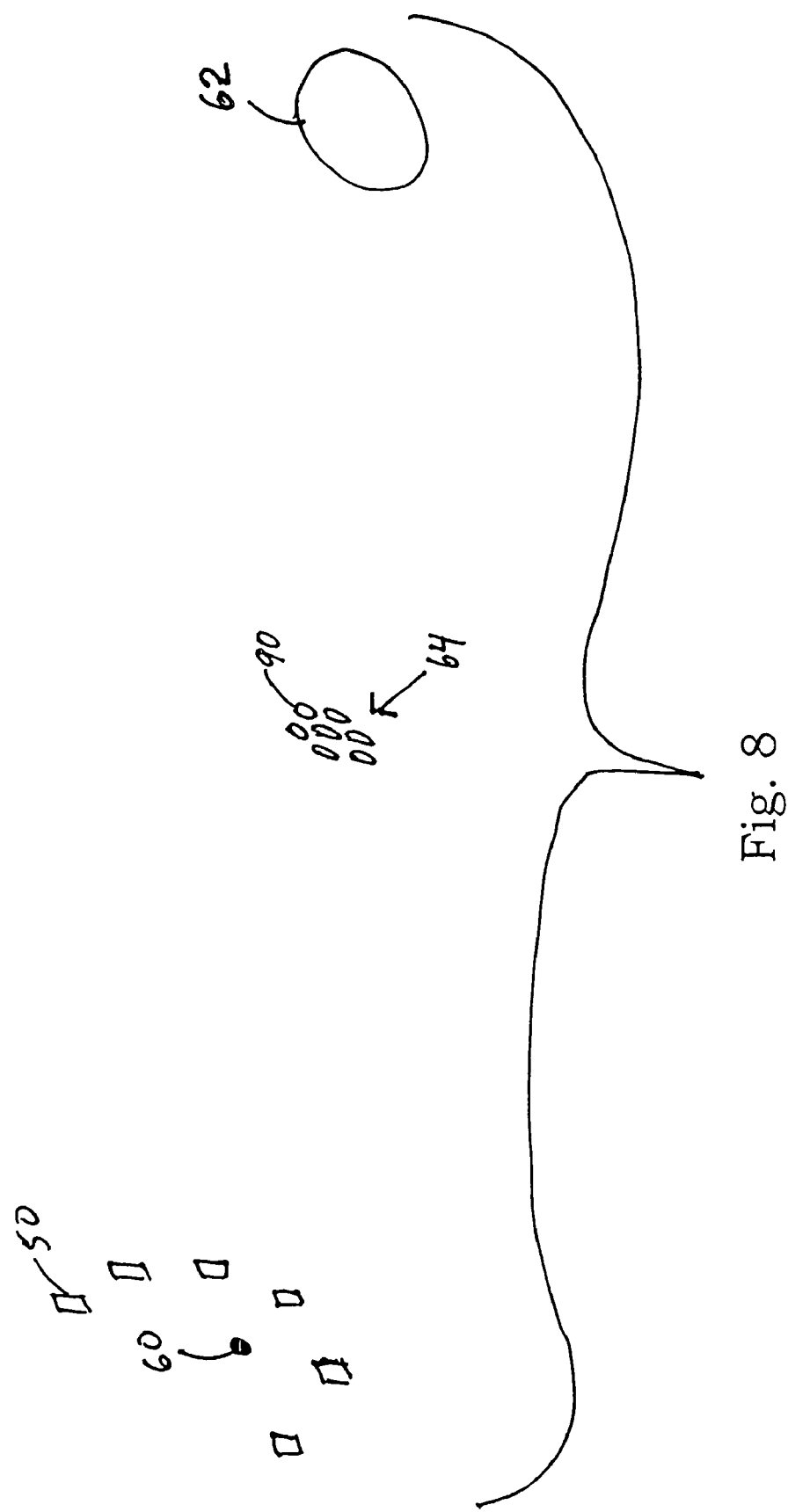
FIG. 8 is a diagrammatic view of a method for forming a focal location having a predefined height or width or multiple generally planar hot spots.

FIG. 8 shows that the arrays 50 may form a focal location 64 having a predefined height or width by forming several focal sub-locations "on top of" or "below one another" or "to the side of one another."

Figure 9:
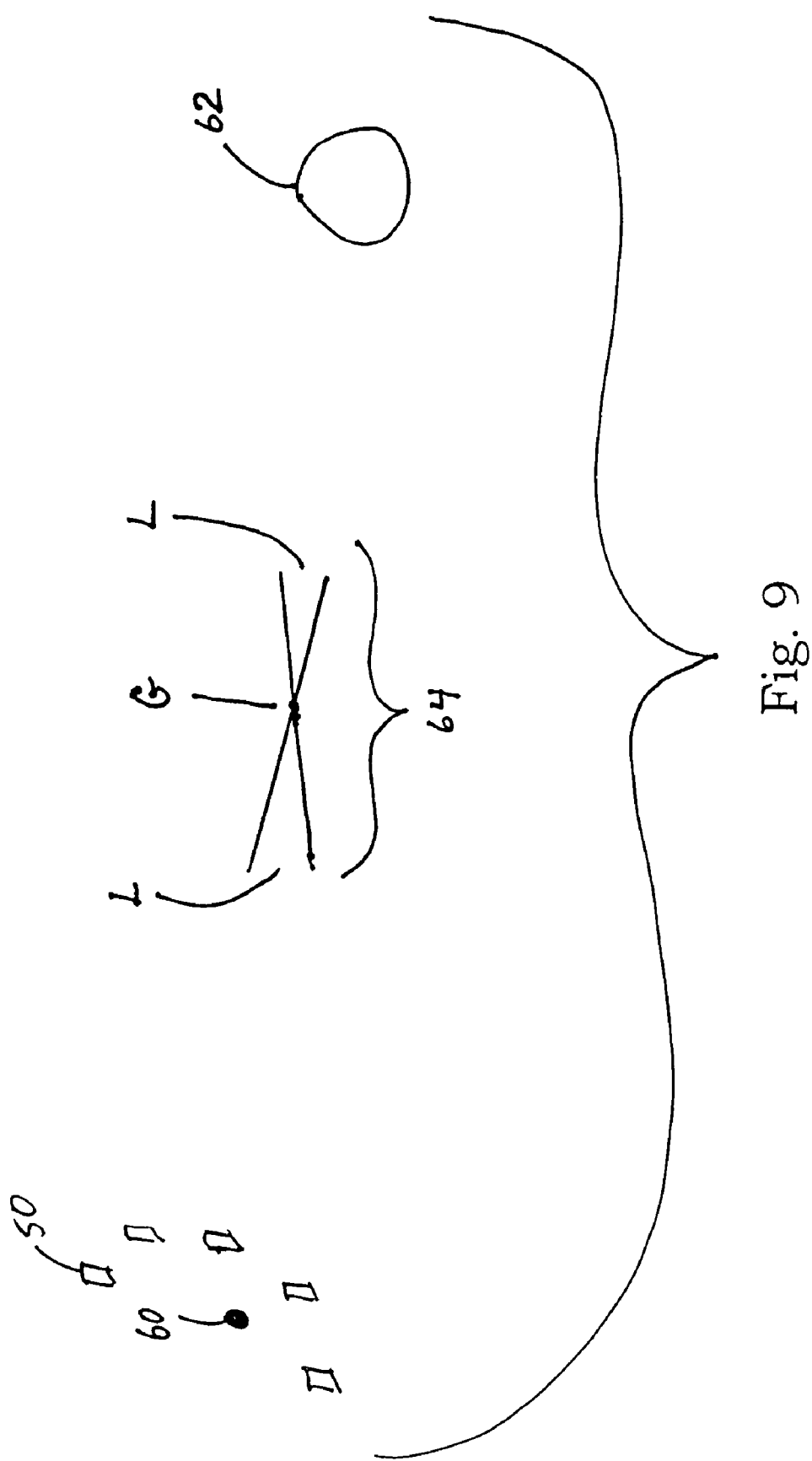
FIG. 9 is a diagrammatic view explaining how the invention may work, where the focus location is defined as having a gradient.

FIG. 9 shows one understanding of the invention. Here the focal location 64 is shaped like two cones placed tip to tip. The reference character L indicates a base of one of the cones and is an area of lesser concentration of light energy reflected by the arrays 50. The reference character G indicates the tips of the cones and is an area of great concentration of light energy. The area between area L and area G is a gradient where the concentration of light energy increases. The area defined by the two cones in combination may alter or dissipate or deflect solar radiation.

It should be noted that solar radiation, or certain features of the solar radiation, passing through the focal location 64 may be monitored on Earth or in space by sensors. These sensors may detect the amount of solar radiation and the type of solar radiation as well as other characteristics. In response to the features sensed, the amount of reflected solar radiation being sent to the focal location 64 may be increased or decreased, or the depth or width or height of the focal location 64 may be changed, or the distance of the focal location 64 from the Earth may be changed. Then the solar radiation may be again monitored. Further, the reflectors 10 may be continuously adjusted to account for rotation of the Earth and orbit of the Earth about the sun.

Figure 10:
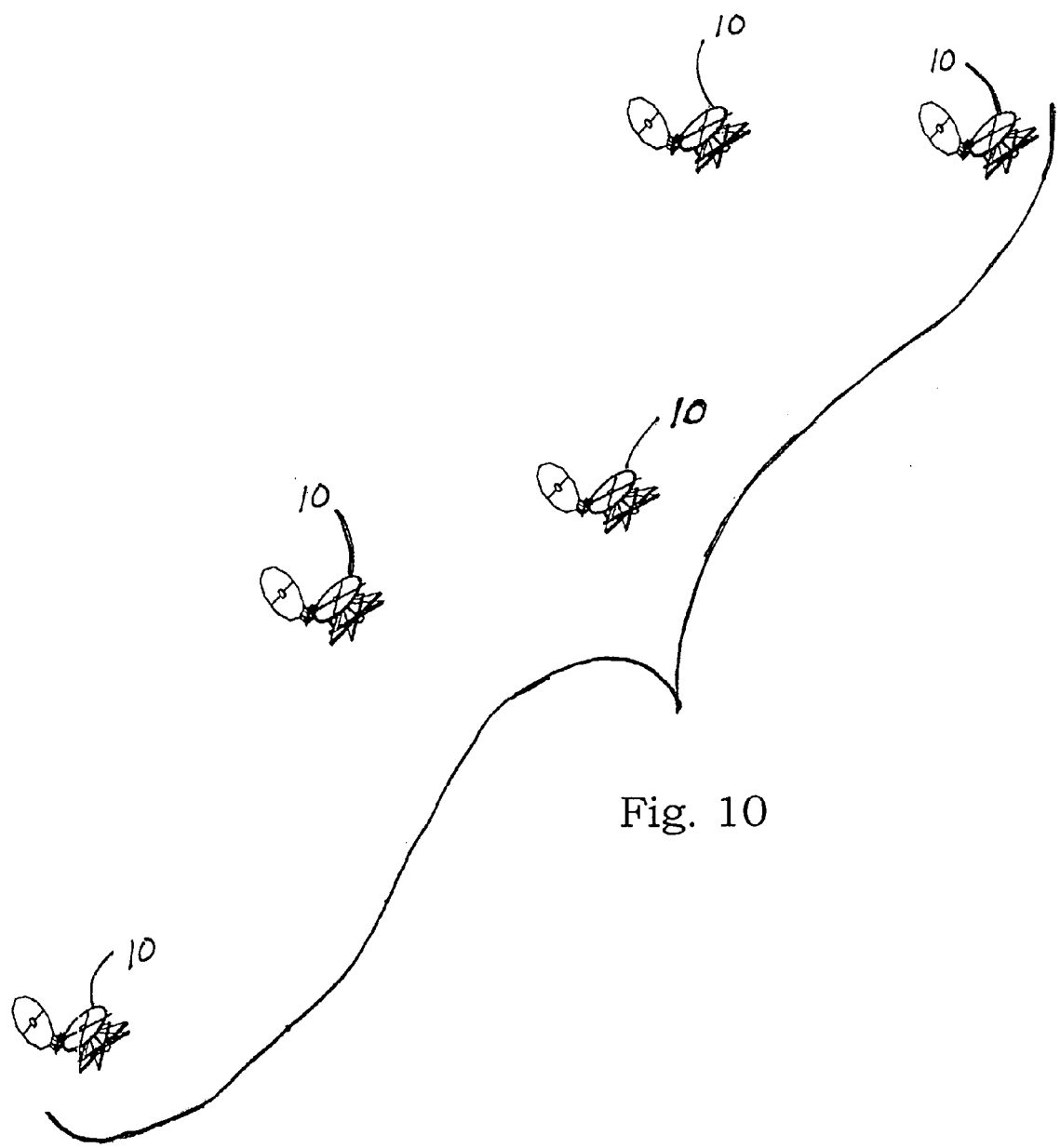
FIG. 10 is a diagrammatic view showing that the reflectors, and not merely the arrays of reflectors, may be spaced from each other.

FIG. 10 shows the reflector 10 (having a cover) spaced from other reflectors 10. As indicated above, the reflectors 10 are spaced to be preferably between about one to about 100 miles apart, more preferably between about five to about 50 miles apart, and even more preferably about five to about 20 miles apart, and most preferably about ten miles apart. When so spaced, the reflectors 10 may be positioned so as to form one of the arrays 50. The positioning of the reflectors 10 in such an array preferably takes the form of a plane, a cone, a sphere, a portion of a sphere so as to take a convex or concave position, or another geometrical shape so as to permit relatively simple mathematical computations. However, if desired, the reflectors 10 may be irregularly positioned so as to maximize efforts by foes who may attempt to locate the reflectors 10. FIG. 10 shows such an irregular positioning. Further, it can be appreciated that FIG. 10 shows only a schematic representation of the reflectors 10. In practice, the reflectors 10 are most preferably spaced about ten miles apart from each other.

Figure 11:
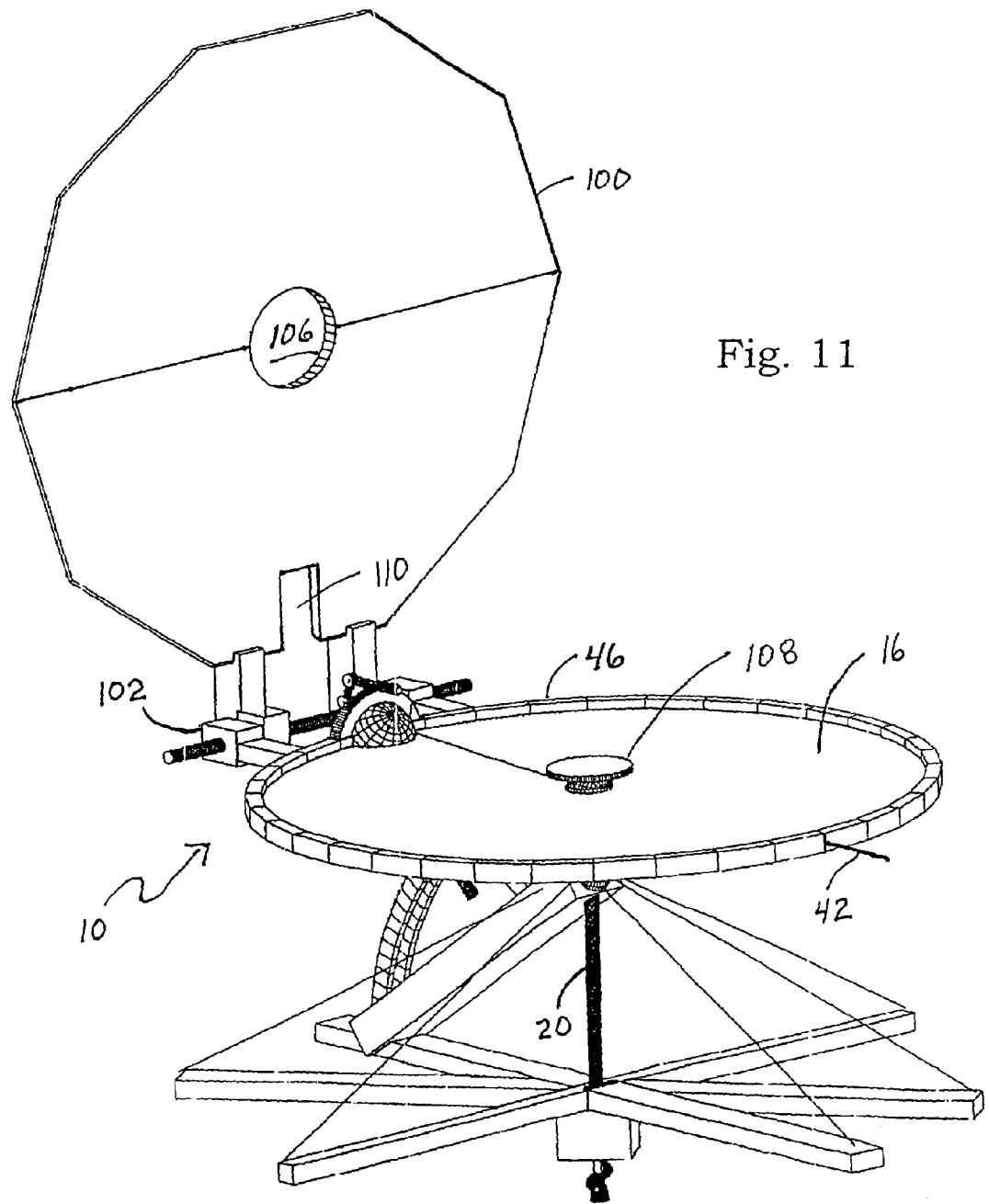
FIG. 11 shows a perspective view of an improved reflector that includes a nonreflective cover and an opening in the cover for a mirror for aiming, whereupon, when the reflector is aimed, the cover opens to permit firing.
Figure 12:
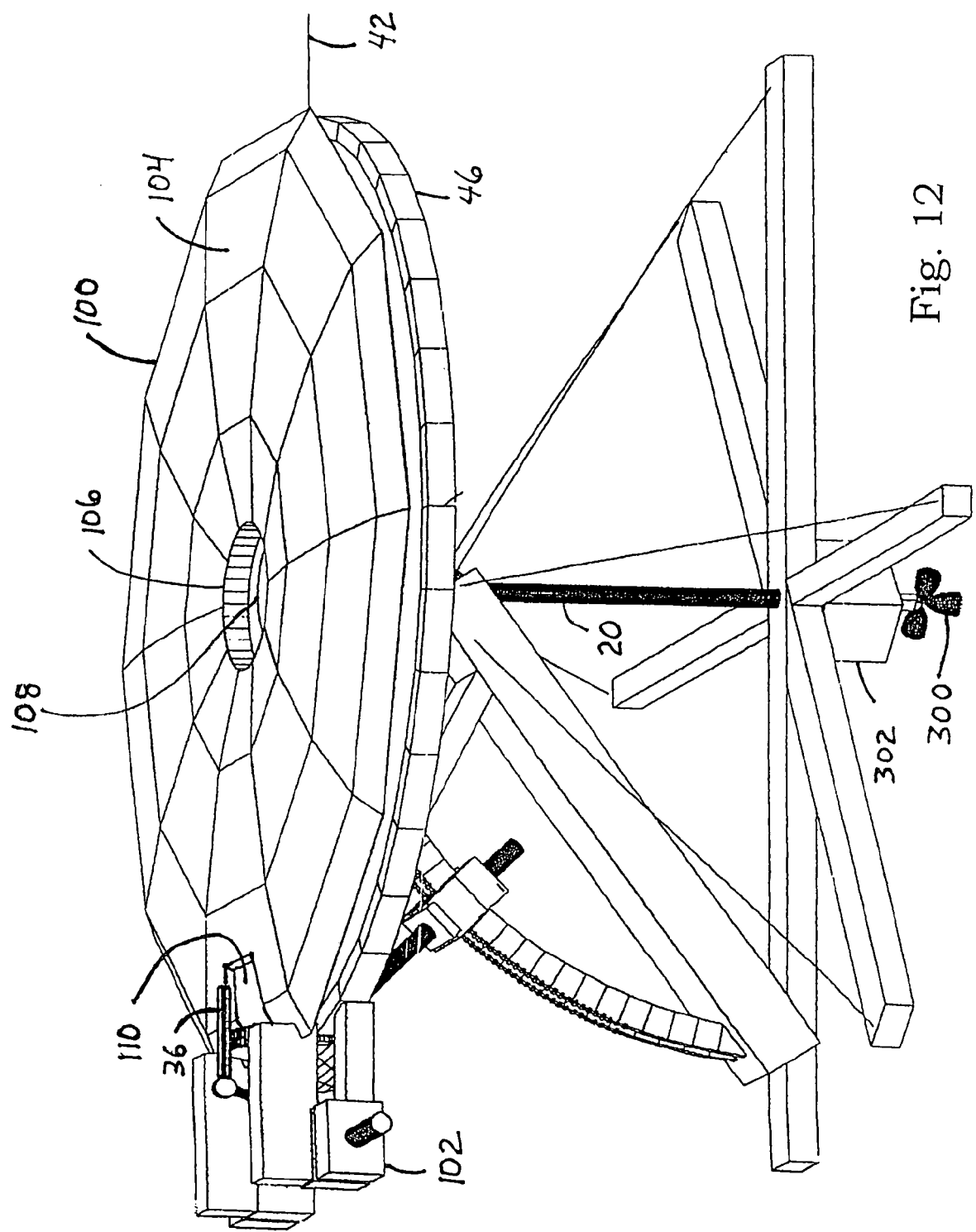
FIG. 12 shows a perspective view of the improved reflector of FIG. 11 with the cover closed.

FIGS. 11 and 12 show the reflector 10 having a cover 100. The cover 100 is hingedly secured to via a hinge mechanism 102 to the peripheral frame 46. The periphery of the cover 100 is about the periphery of the frame 46 and such peripheries confront each other when the cover 100 is in the closed position, as shown in FIG. 12. The cover 100 is opaque so as not to permit the transmission of light. The cover 100 includes an outside surface 104 of nonreflective material so as not to reflect light. The cover 100 has an aperture 106 that is slightly larger in diameter than the diameter of a mirror or reflector 108. The mirror 108 is positioned at the exact center of the reflecting member 16 and may be secured to the post 20. When the cover 100 is closed, the aperture 106 permits the mirror 108 to reflect light. The purpose of the cover 100, aperture 106, and mirror 108 is to quickly increase and reduce the amount of light transmitted to a focal location 64. For example, one function of the adjustment of the amount of light to reach a focal location is in aiming and firing. The reflector 10 may be aimed with the cover 100 closed such that only the mirror 108 is reflecting light to the desired location. When the computer reports that the reflector 10 is focused on the location (i.e., aimed on the location), the cover 100 is opened to the open position shown in FIG. 11. Such "fires" the reflector 10 upon the desired location. It should be noted that the mirror 108 may be relatively small in size, such as a million times smaller than the size of the reflecting member 16 so as to minimize knowledge at the desired location of the targeting.

It should be further noted that the cover 100 may be "cut in half," where the other half may be mounted on a hinge mechanism positioned 180 degrees from hinge mechanism 102. Accordingly, the cover 100 would work like two flaps opening and closing. Such a structure may minimize the work load on the part of stabilizers such as gyroscopes.

It should be noted that a slot 110 may be formed in the cover 100 to permit a portion of the gear 36 to pass through the cover 100. The portion of the reflecting member 16 associated with the slot 110 when the cover is 100 is closed may be deactivated or may be permitted to remain active.

Figure 13:
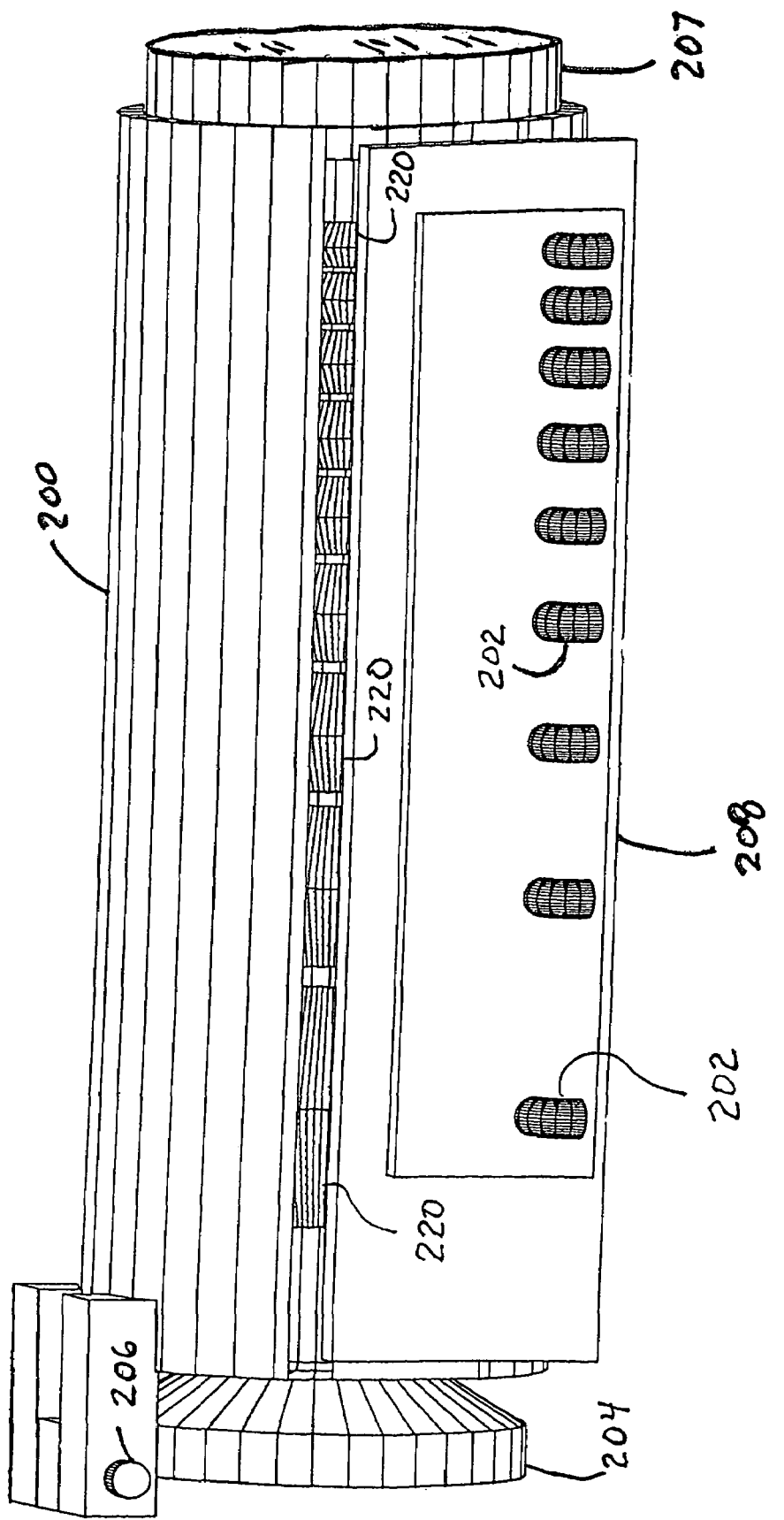
FIG. 13 is a side view of a smelting tank for use on the moon.

FIG. 13 shows an in space vacuum lunar tubular smelter 200. The smelter 200 includes drain pipes 202 for the molten and centrifugally separated material, an ore door 204, and a hinge mechanism 206 for the door 204. The smelter 200 further includes a cap 207 on the end of the smelter 200 opposite of the door 204. The smelter 200 is rotatable and tiltable relative to a base 208 having a drive mechanism for rotating and tilting the smelter 200.

Figure 14:
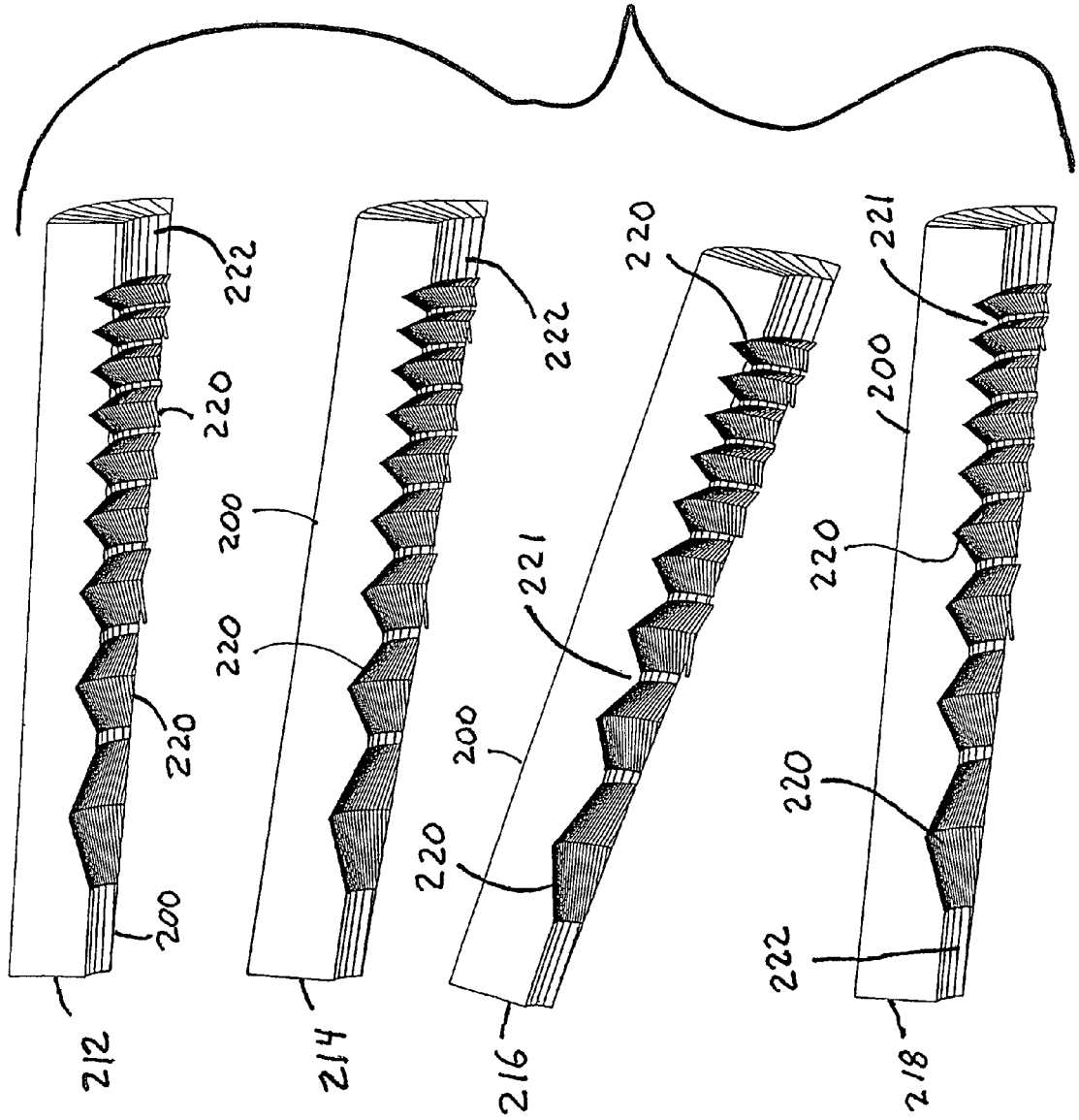
FIG. 14 is a schematic view of a rotating portion of the smelting tank of FIG. 13.

FIG. 14 shows four orientations of the smelter 200. Reference numeral 212 illustrates a level position for the smelter 200, reference number 214 illustrates a minor tilt to the smelter 200, reference number 216 illustrates a greater tilt to the smelter 200, and reference number 218 again illustrates a level position for the smelter 200. It should be noted that FIG. 14 shows top portions of grooves 220. The raw ore and molten ore are in bottom portions of the grooves 220 and remain in the bottom portions of the grooves 220 as the smelter 200 rotates.

The grooves 220 formed in an interior face 222 of the smelter 200 are means to separate molten material into different molecular weight compounds suitable for ingots for later alloy manufacturing. Each of the grooves 220 communicates with one of the drain pipes 202 such as via a valve opened when the smelter 200 has stopped rotating. Each of the grooves 220 runs endlessly back to itself on the inner sidewall 222. Each of the grooves are circular. The grooves 220 do not communicate with each other and molten material spills from groove 220 to groove 220 over the walls 221 separating the grooves 220. The grooves 220 are not spiral.

The position shown by reference number 212 is a relatively level starting position, such as when the door 204 is swung open via the hinge mechanism 206 to permit ore to be loaded into the smelter 200. The position shown by reference number 214 permits lighter molten material to flow over the denser molten material gradually thus improving mining efficiency. The position shown by reference number 216 permits a greater number of densities to be separated per smelting load. The position shown by reference number 218 is a relatively level position, prior to or when the molten material is discharged through the drain pipes 202.

In operation, the door 204 is opened. Then the ore is added through the door 204. Then the door 204 is closed and the cap 207 is closed. The ore may be lunar ore and the smelter 200 may be located on the lunar surface or other body having at least some gravitational pull. Then the reflector 10 or an array of reflectors 10 may be focused upon the smelter 200 and the smelter 200 is rotated. As the ore may begin to vaporize prior to being melted, vacuum systems may be installed, such as via the drain pipes 202, to draw off the vapors. The vapors, such as oxygen or metallic, may be valuable to sustain life or may be valuable in monetary terms. The smelter 200 is rotated so as to heat all portions of the endless sidewall of the tubular smelter 200 and so as to raise the interior temperature of the smelter as much as is desired. As the ore begins to melt (after or during vaporization), it is believed that metals of lesser density may be melted first. Or, if several ores having densities close to each other are melted at about the same time, it is believed that the metals may naturally separate from each other and the lighter density metal or material will float on tops of the heavier density metal or material. At about the same time, the base 208 may be operated to begin to tilt the smelter 200. As the smelter 200 tips, the lighter density ore will spill over from the relatively wide groove 220 to the adjacent relatively less wide groove 220. As the temperature rises even further, the tilting and attendant spilling into adjacent grooves continues. The process can be stopped and liquids drained and then restarted regardless of the tilt of the smelter 200.

The largest or most wide groove 220 is closest to the door 204 and is where the raw ore is placed before being vaporized or melted. As the grooves 220 run toward the cap 207, the grooves 220 become more narrow since progressively less molten material will find its way into such grooves. The relative height or altitude or relative depth of the grooves 220 may be adjusted based upon the relative densities of the materials in the ore.

This invention is extremely theoretical, however, said invention is based on the observation that light passing through a propane torch flame is concentrated enough to form a brightened silhouette of the flame. The concentration effects only a minuscule amount of the light emanating from an incandescent flood light, and the mechanism is not understood by this inventor. However, observing the silhouette effect did give rise to these primitive means to alter the solar influx reaching the Earth, along with the joy of realizing that a previous invention of mine, shown in U.S. Pat. No. 6,042,224 with structural modifications, could be used to ameliorate a most probable future climatic catastrophe.

For example, it is widely believed that Mars had flowing water on it millions of years ago. It seems to me that a similar water loss most probably will become the history of Earth in the future. Therefore, it seems reasonable to me that, even with all the mistakes people make, studying the effects of massive amounts of light and heat on the solar influx would be prudent, even if the results provide only a few years of reprieve for the Earth in the event climate conditions wreak unprecedented havoc on human existence.

It is also most probable, according to some climatologists that there could really be a coming global super storm, which is believed to have occurred in the Earth's distant past, after which the array of arrays could be used to melt the ice, if need be.

The array of arrays could also be used to heat the stratosphere, thus preventing the coming global super storm, as a super cooled stratosphere is believed to be a prerequisite to a global super storm. When all reflectors reflect to one point, an increase in temperature in the stratosphere may occur momentarily. Heating the entire stratosphere may require a continuous adjustment of the reflection points or focal points in-order-to more evenly warm the stratosphere and reduce the disruption of the stratosphere's normal circulation.

I know of no prior art specifically designed to reduce solar influx. However there are several natural phenomenon that reduce the solar influx that reaches the Earth's surface, such as smoke from numerous wood cook fires, or forest fires, large volcanic plumes, numerous aircraft condensation trails, the industrial revolution's smog trails, massive amounts of snow, (which removers water vapor a greenhouse gas and reflects solar influx), coral growth removing $CO_2$ a greenhouse gas, or peat bogs doing the same.

Other man made prior art that is entirely unproved and indirect include such things as Tesla's work on global weather control, or currently H.A.R.P. (high altitude research project) by the US government. Please note, that I have been led to believe other such projects exist which are produced and run by other governments.

Other unforeseen developments arising from new phenomena developed from knowledge of this invention, such as low density plasmas, which may result in new matter formulation, new nuclear particle streams, or new energy forms unknown to man, or new levels of gravity and weak force interactions, may occur in a low mass high energy hot spot in the relative vacuum of space without the gravity normally present within stars (where this type of activity may presently be occurring). This new environment, a low density extremely hot spot or focal location may cause greater effects on the solar influx than the heat alone.

It may even be possible to create a light shock wave similar to a sonic boom which would conceivably reduce the solar influx reaching the Earth.

The above may also be a way to open inter-dimensional travel, which might become a way to transport the entire Earth to a new solar system. Or it might be a shot heard around the universe.

The following simple experiment demonstrates that the heat from a propane torch alters the light from an incandescent light: shining such a light through a propane torch flame produces a silhouette which replicates the brightness and dimness corresponding to the same brightness and dimness produced by the torch flame. Why this happens is unclear to me. However it warrants further study to learn how to predict what might happen with larger amounts of energy thus to perhaps save the world, temporarily, from Earth born climatic disaster or from increased solar influx that will occur as the sun ages.

The purpose of this array of arrays is to regulate the influx of solar energy to the Earth in the event of climatic catastrophe. The current global warming sensibility may be unwarranted. However, preparation may become the life boat we all will need.

This invention is extremely theoretical, as the mechanism of light alteration by heat or a focal location has only been observed by the inventor, with the physics behind this function completely unknown. A further purpose of the invention is to provide an impetus to study the mechanism of light alteration by heat or other radiation, thereby enabling a possibly more efficient and thus less costly array, or other means to alter the solar influx, if it becomes necessary to alter the solar influx.

The purpose of this array of arrays is to regulate the influx of solar energy to the Earth in the event of climatic catastrophe. A second purpose of the invention is to provide an impetus to study the mechanism of light alteration by heat or other radiation, thereby enabling a possibly more efficient and thus less costly array of arrays, or other means to alter the solar influx, if it becomes necessary to alter the solar influx. A third function of the present invention is an inducement to develop better solar sail boosters. Other uses may appear at a later time.

As presently envisioned an array of arrays of reflective surfaces is to be positioned about the Earth, in space, in-order-to create a hot spot or focus location of sufficient strength to reduce the solar influx that reaches the Earth for use in the event climatic changes warrant. Such changes include:

1) a super cooled stratosphere, which is a presumed prerequisite to a global super storm;

2) a severely reduced ozone layer with little hope of its normal regeneration by UV light prior to the complete sterilization of the Earth;

3) general climatic overheating that results in making deserts of most of the land on Earth; or 4) other unknown and future solar emissions which may damage the Earth's thin and fragile biosphere.

The amount of heat and the size or shape of the hot spot or focal location is adjustable by several structural means. This is the primary point of view used to understand this invention There are several ways to arrange the array of arrays, each of which have benefits which become important depending upon the results obtained by the heat on the solar influx.

One is by arranging the reflectors at a particular large distance from the Earth's center, in space, that creates a shorter hot spot or focal location which may coincidentally create a path for solar radiation to travel at an angle to its normal flow, thereby by-passing the Earth. This path effect may occur due to some unknown effect the hot spot or focal location has on the solar influx.

This form of the array of arrays may also work by interfering with the normal solar radiation which may alter the intensity of the incoming solar influx by diffusing it, thereby creating an energy reduction which may reduce the solar influx enough to reduce global warming.

A second arrangement of the array of arrays may be to arrange the reflectors circumferentially, in space, closer to the Earth in-order-to effect a longer hot spot or three dimensional focus location thus increasing the time the heat or focus location or focus sub-locations react with the incoming solar influx, thus increasing the diffusion of the incoming solar influx, thus further reducing the solar influx that reaches the Earth, thus having the desired effect on the climate, possibly with fewer arrays, thus reducing overall cost. This method may also, coincidentally, provide a path effect for the solar influx to traverse, thus bypassing the Earth, by providing positioning the focus sub-locations so as to form a three dimensional shape to the focus location. On the other hand, there might be developed a low number of turn lasers providing a suitable reflective surface coating for the surface of the reflectors.

A third means to create the desired effect (of reducing global warming or bio-sphere damage) of solar influx reduction to Earth, may be to place the reflectors at a distance from the center of the Earth that is incompletely circumferential about the Earth, in space, thus encircling only a portion, such as one quarter or one half, of the circumference of the Earth, in space, except the arrays are located in space, while also remaining in geosynchronous orbit with the Earth's orbit about the sun and about the Earth about the sun. This method may be required if the hot spot causes a focusing effect which will then automatically be directed to miss the Earth's environs.

A fourth means is to adjust the total amount of reflecting surface area reflecting solar influx back towards the sun.

A fifth means is to adjust the size of the individual reflecting surfaces in-order-to concentrate the heat into a smaller and possibly more lengthy hot spot or focus location, thus increasing the heat of the hot spot or the amount of light energy at the focus location and increasing the time the normal solar influx is heated, thus increasing the alteration of the normal solar influx. A "lengthy hot spot" is a three dimensional focal or focus location may up of a number of focal sub-locations in front of each other and aligned between the Earth and the sun such that radiation emanating from the sun passes through each of the focal sub-locations until it is sufficiently disrupted.

A sixth means to reduce solar influx is to place various filters on the arrays which would increase the effectiveness or selectivity of the hot spot or focal location.

A seventh means is to place some other obstruction at some point between the Earth and sun that would reduce the UV light or other solar radiation reaching the Earth. However, I believe that the remaining unaltered solar influx would bend around the object thus reducing or eliminating its effectiveness or increasing its cost prohibitively if the desired results (bio-sphere protection) are to be obtained.

Other alterations to the arrays include filters on the reflectors to make the reflected solar influx polarized, or to reflect only UV light, or to reflect only infra-red light, or other filters or other processes that are unknown to me such as, low frequency radio waves that may be emittable in sufficient quantity to have unknown effects on the super-heated solar influx. After all, low concentrations of low frequency radio waves have produced previously unknown biological effects. For example, cows and people were reported to have their biological rhythms shattered (many of the cows died) with low levels of low frequency radio waves which the US Navy used temporally for nuclear submarine navigation.

It may be desirable to augment the reflectors with input of any of the above mentioned items or various laser inputs, which may have unknown regulating or modulating influences on a hot spot or focus location of such magnitude.

Other unforeseen developments arising from new phenomena developing from this invention, such as low density plasmas, which may result in new matter formulation, new nuclear particle streams, or new energy forms unknown to man, or new levels of gravity and weak force interactions, may occur in a low mass high energy hot spot in the relative vacuum of space, without the gravity normally present within stars (where this type of activity may presently be occurring). This new environment, a low density extremely hot spot or focal location, may cause greater effects on the solar influx than the heat alone.

The drawings show a simplified single reflecting unit of an array, a small portion of one array, an array of arrays about the Earth reflecting solar influx into a hot spot or focal location, an embodiment useful for focusing concentrated solar influx off Earth, an embodiment useful for heating the stratosphere, a means to pivot an object on two axis from one input area, and a view of the single point two axis aiming input.

FIG. 1 illustrates a more space worthy design of my U.S. Pat. No. 6,042,240 due to the present invention's fewer parts, reduced mass, and its aiming input from one location. Additionally, the useful innovation of pivoting at the center surface point of each reflector reduces the number of calculations required for aiming thus it increases speed and accuracy, thus it improves overall efficiency and effectiveness. Please note that the size of the pivot points 14, 22 are not to scale in-order-to ease illustration. Additionally, the exact means to attach the parts to each other is omitted. I envision that magnets that fit together about the pivot points 14, 22 snugly with the reflective surface between them would be effective.

The guide 26, mounted to the support post 30 of the reflector 16, for stabilizing one axis of rotation 32 is purely illustrated as a means to indicate its necessary function. The final design may include function as part of the overall structure, in-order-to reduce overall mass.

The input of the other axis of rotation 42 is mounted on the first pivot input location 14 as a means to further reduce the calculations due to the resulting simplified structure. As envisioned here it is a flexible shaft 38 that passes through a splined input gear 36 which in-turn rotates the reflector 16 about the second axis 42. The flexible shaft 30 and splined shaft 36 accommodates the motions of both axis motions with reduced or eliminated aiming calculation input due to the complex motions encountered with separate input positions. There is a base 12 which is used primarily as a means to interconnect the reflectors 10 into a stable array. In the final design, such as combining the support 20 and the first axis guide 36, it too may become better integrated as part of the structure by performing multiple tasks. It is important to note that the individual reflectors 16 need not pivot a great amount about their axis 32, 42 as the distances to the aiming point are great, with the resulting minuscule input motions altering the aim point immensely. Additionally it is important to note that the greater the deflection of the reflectors 16 from perpendicular to the sun, the less energy is available for reflection due to the corresponding reduction of surface area available for reflection. For example, if rotated to 90° from perpendicular to the sun, there would be no surface available to reflect solar influx. Additionally, with greater deflections from perpendicular to the sun shadows from one reflector 16 would cover a portion of the next reflector 16, thus reducing effectiveness of the array 50. An additional means to reduce the calculations of aiming is to make the first axis power input motions traverse an arc with a radius equal to the radius of the reflector 16.

Additional uses for the central surface pivoting include microwave relays or radio antenna.

FIG. 3 illustrates a portion of one compact arrangement of the reflectors. This style of arrangement provides simplified calculations for aiming the individual reflectors.

An alternative compact arrangement would be to arrange the individual reflectors in concentric rings.

Please note it may become apparent that other less flat overall arrangements of the individual reflectors may provide better results.

FIG. 4 illustrates an in space circumferential arrangement of an array of arrays about the Earth. The closer the arrays are to the Earth the longer the hot spot or focal location can be between the Earth and the sun. This may result in a greater effect on the normal solar influx than the hot spot resulting from an array of the same area positioned in space at a greater distance from the Earth's center.

It is conceivable, if the hot spot is hot enough (or if the focal location has sufficient light energy), to create a light shock wave which would have unknown effects.

FIG. 5 illustrates an arrangement of arrays which would aim the concentrated light to an area off Earth. This a possibility as the silhouette of the flame illustrates light concentration after passing through the heat of the flame. I believe that an array of arrays covering ¼ to ½ of the in space circumference of the Earth would provide a means to aim the concentrated solar influx off Earth.

FIG. 6 illustrates (not to scale) an arrangement of arrays useful for heating the stratosphere. The arrangement shows a momentary alignment to one concentrated hot-spot which is undesirable as it would have disruptive effects on the stratosphere and its normal circulation. In-other-words, the arrays' individual reflectors would be continuously aiming at different points in the stratosphere to warm it gently, in the hopes of avoiding a global super storm.

FIG. 1 illustrates a means to adjust two axis of rotation 90° to each other. It is possible to rotate two axis that are not 90° to each other also with this style of mechanism provided the second axis is activated from a position on the first axis other than vertical on the first axis spherical pivot when perpendicular to the central support post. The basic system involves a flexible splined shaft that passes through a splined opening in a gear that drives one of the axis of rotation. The actual means to transfer the torque to the gear need not be splines.

FIG. 2 illustrates a cut away view of the aiming single input location. This design with equal radius reduces the calculations necessary for aiming. This advantage increases accuracy and speed along with reducing costs. The dual sets of gears on the first axis arc reduce torque about the central support shaft thus contributing to a more stable structure in space, which by the way, further increases accuracy by reducing the number of corrective inputs for positioning the entire array.

Generally, my invention includes the following features:

1) means to regulate solar influx reaching Earth via reflected solar influx to a thus created hot spot or focal location or focal sub-locations which can diffuse or scatter the normal solar influx from the sun;

2) means to regulate solar influx reaching Earth via reflected solar influx to a thus created hot spot or focal location or focal sub-locations which can concentrate solar influx and redirect the focused influx off Earth;

3) means to heat the stratosphere with reflected solar influx;

4) means to pivot about the surface central point of an object such as a reflecting surface;

5) as a pivoting structure in other apparatus such as microwave relays or radio antenna;

6) means to pivot an object on two axis 90° to each other from a single input area; and 7) means to pivot an object from a single point two axis other than 90°.

My invention further includes an arrangement of an array of arrays of reflecting surfaces about the Earth in space that allows for the adjustment of solar radiation reaching the Earth, resulting from reflecting enough solar radiation back toward the sun into a focal area or focus location between the Earth and sun that will interfere with the normal solar influx to the Earth from the sun. This may be explained through the wave theory of light where light energy emanating from the sun may be altered by light energy formed at such focus location. The normal solar radiation passing through this hot spot or focus location could be diffused or scattered, or even concentrated or converted to other forms of energy. If concentrated or focused, redirecting the energy to miss contacting the Earth is possible by arranging the arrays in an arc in space about a portion of the Earth's circumference. The amount of heat or light energy and the size of the hot spot is adjustable by a number of means such as by creating a number of focus sub-location or such as by several structural means, such as the size of individual reflectors, the overall size of reflecting surface, and the arrangement of the arrays about the Earth. Additional structural inputs may be filters on some of the reflectors, laser add-ons, radio wave emitter add-ons, or other means which are familiar to those skilled in this new art. It is believed that the concentrated heat (i.e., the focus location) has an effect on normal incoming solar radiation. It is believed that this effect is a reflecting or conversion of light energy, and that alteration of this light energy may be accomplished by adjustment of the reflectors and their attachments.

My invention is a two axis, surface pivoting, low resonance, reflecting apparatus 10. This apparatus 10 provides multiple use for a single array 50 of reflectors 10, especially in space. The primary improvement is due to the spherical pivots 22 located at the surface 16 of the reflectors 10. An additional improvement is the use of two axis motion input from one, usually edge mounted, spherical input pivot 14. This advantage encompasses reduced calculations for aiming or focusing, and reduced mass, which is always a cost saver in space applications. This reduced mass also reduces resonance or vibrations and thereby increases their control. An advantage to independent reflectors 10 is the ability of the entire array 50 to survive attack or asteroid impact, provided they are spaced far enough apart. An additional advantage of wide spacing is the ability to reduce collateral damage or environmental damage downrange of the target, because the focal length is short. Thus, the hot spot (focal length) is correspondingly short. Some uses include melting ice, digging canals, and vaporizing toxic waist dumps on earth, and smelting ore on the lunar surface with specially designed centrifugal and tilting smelters and collectors.

Due to the recent near misses of Earth by hitherto unknown asteroids which could have destroyed continents on Earth and caused other environmental catastrophes, an important use would be to deflect asteroids (future meteorites) via vaporizing portions of these asteroids which would alter their trajectory, via the resultant opposing reaction due to the velocity of ejected material, were we able to see these asteroids coming. A similar protective function could also be provided for the present international space station or future international space stations. All of this, and more, is possible from one properly placed array 50 of 2000 independently operating one square foot reflecting satellites 10, i.e., my two axis, surface pivoting, low resonance, reflecting apparatus 10.

Most devices that use adjustable reflective surfaces have pivot points behind the reflective surface. This requires much hardware and calculations in order to accurately aim and direct reflected light or infrared energy or to redirect air, or sound, or other fluids, in-order-to provide better means, for example, of mixing of chemicals. Gimbals are an additional means to provide two axis adjustment to surfaces They are conventionally below the reflecting surface of whatever is being reflected. This requires frameworks and additional mounting hardware, plus additional connections for the aiming of the apparatus. Additional hardware is required for dampening these additional structural appendages to remove and stop resonance and vibration that can be caused by adjusting and aiming the apparatus. Another source of vibrations in the space based applications are impacts from micro-asteroids or heavy solar wind gusts.

My surface pivot designed reflector 10 reduces all of these complications and simplifies the aiming calculations. Light or infrared energy reflections is the primary function of my reflector 10.

An additional consideration is the overall design of an array 50 of these independent reflectors 10. The use of independent reflectors 10 allows for greater survivability in the event of an attack or natural destructive asteroid impacts. This independent arrangement also reduces overall weight and resonance complications of a large object in space.

FIG. 3 shows reflectors 10 that may or may not be engaged together. FIG. 10 shows independent reflectors 10. The use of independent reflectors 10 also allows for a large space between reflectors 10 and varying altitudes which have results of reducing or eliminating down range of target damage or other environmental damage.

An additional consideration is the computing capability to regulate the number of reflectors 10 aimed at a target thus enabling greater usefulness of the apparatus. For example, these targets include the melting of ice off mountain pass roads, thus allowing roads to remain open, or the melting of ice off ships, harbors, airports, or even airplanes.

These additional uses beyond vaporization is also accomplished via aiming portions of an array of reflectors 10 at areas thus concurrently covering an area larger than the individual surface 16 of each reflector 10. That is to say, aiming a smaller number of reflectors 10 at each square foot of target results in a means to regulate the temperature rise of the target. These abilities are difficult to obtain with single use parabolic reflectors, heretofore generally considered for use in space applications.

My reflector 10 employs the use of spherical pivot points 14 and 22, one (point 22) centrally located in the reflecting surface while the adjustment input pivot point (point 14) is located at some distance from the central pivot sphere (point 22). This arrangement allows for two axis adjustment because the second axis adjustment input originates from the first axis adjustment sphere via a mechanism that is optimally (in this application) 90 degrees from the motion of the first axis. By pivoting on the same adjustment input sphere the inputs need not accommodate the resultant motions of the movements of the surface were there a separate pivot point for the second axis adjustment. This is an advantage due to the reduced calculations due to reduced motions of the reflecting surface during aiming and/or tracking. It may in some instances be useful to have the main pivot point of the reflecting surface located off center.

This method of pivoting or gimbaling maybe useful in other items, such as and not limited to, computer operated gun targeting systems, gyroscopes, and navigational devices.

Additionally is should be noted that it may, in some instances, be useful to have the pivot point 22 of the reflecting surface 16 located off center.

It is important to note that the smaller the spherical pivot points 14, 22, the greater the reflecting surface area 16, which translates into greater effectiveness per given size reflector 10. A circular shape utilizes the least material, thus it reduces weight, which is an important cost consideration in all space applications. In other words, other shapes for the reflector could be used. However, they would cost more, and possibly have results that are required only for more specific needs.

Additional consequences of a small spherical pivot are increased wear, and possibly a reduced angular motion, due to contact with the support mechanisms.

It could be possible to place a flat reflector over the central pivot sphere 22 and parallel to the main reflecting surface 16, if cost considerations allow it, or if that aforementioned smaller reflector 108 were to be used as aim point certification, usable while the main reflector 16 is covered. This covering option 100 could also be a safety feature reducing accidental vaporization of a target during the initial aiming process.

Such a covering 100 could also be used as protection from micro-meteorites and dust accumulation, even in space. These covers 100 could be unfurled (opened) when the reflector 10 is in use.

An additional consideration is the overall design of an array of these independent reflectors 10. The use of independent reflectors 10 (such as shown in FIG. 10) allows for greater survivability in the event of an attack or natural micro asteroid impacts. This independent arrangement also reduces overall weight and resonance complications of a large object in space. The use of independent reflectors 10 also allows for a large space between reflectors 10 and varying altitudes which have results of reducing or eliminating down range of target damage or in-other-words collateral or environmental damage. For example, 2000 one square foot reflecting surfaces 16 spread over a 2000 square mile area in space at an altitude of 23,000 miles (geosynchronized orbit) would, if aimed at an object that was flying at 1000 feet above ground level, have no effect on the ground below the flying object. Actually the length of the heated area of intersection (focal location or focal point) of the reflected energy is closer to 60 feet in length in this example. It is also important to note that the center of the reflected energy intersection (focal location or focal point) has, in this example, a one square foot footprint, assuming 100% accuracy. The temperature could range in this example from 1 degree Farenheight to 10,000 degrees Farenheight above ambient temperature. Higher temperatures could be reached with more reflectors 10.

Changing the size of each reflector 10 would increase the footprint size and so-called focal length hot spot.

An additional consideration is adding computing capability to regulate the number of reflectors 10 aimed at a target thus enabling greater usefulness of the apparatus 10. Some examples include the melting of ice off mountain pass roads, thus allowing roads to remain open, or the melting of ice off ships, harbors, airports, or even airplanes, to mention a few economical uses.

These additional uses beyond vaporization is also accomplished via aiming portions of an array of reflectors 10 at areas, thus concurrently covering an area larger than the individual surface 16 of each reflector 10. That is to say aiming a smaller number of reflectors 10 at each square foot of target results in a means to regulate the temperature rise of the target. This ability is difficult to obtain with single use parabolic reflectors, heretofore generally considered to be state of art for use in space applications.

An additional desirable use of this ability would be to mine the lunar surface via increasing the temperature of an area of the surface via reflected solar input, in increments. This allows the material to vaporize according to the chemical structure that is most volatile. As it off-gasses it could be collected via powerful electromagnets which could be located down wind of the heated area. In this case the wind is formed via the direction of the reflected solar input. Each increment of temperature rise could be coordinated with the electromagnets to either make layers of differing materials or by removing the electromagnets that have collected the vapors of one compound and replacing it with another electromagnet with higher gauss as the temperature rises.

These collections of vapors could also be accomplished in an enclosed smelter (such as smelter 200) or caldron with vacuums pumps. Each temperature range could be collected in different canisters, presumably with different pumps. Please note the vapors could condense before reaching the pump as cooling occurs as the vapors are moved from the enclosed smelter or caldron to the collection canisters. Additionally, electromagnets could be used along the canisters to further organize the material collection enabling greater efficiency of mining operations.

An additional consideration in smelting on the lunar surface is to have the smelter (such as smelter 200) function centrifugally. This would enable separation of molten material in layers. As illustrated a special interior shape of the smelter 200 combined with tilting, further separates the molten material enabling ingots of different material to be poured from a single smelting operation of mixed purity ore.

As noted above, FIG. 1 is an overall view of a single reflector 10. FIG. 2 is a close up cutaway view reflecting workings or operation of components. FIG. 3 is an overall view of smelter tank 200. FIG. 4 shows the smelter interior and positions of the interior of the smelter 200.

FIG. 1 is a view of a complete independent reflector 10. Part 22 is the central pivot point and includes means to connect the pivot point 22 to the reflecting surface 16, such as magnetically attracted spherical ringlets above and below the reflecting surface 16. Reference number 32 shows one axis of adjustment. Reference number 42 illustrates the second axis of adjustment. Part 36 is the drive gear for rotation about axis 42. Part 40 is the pinion gear for part 36. Part 14 is the spherical two axis adjustment pivot. Part 34 is the drive for part 36. Part 38 is the flexible connecting drive to the drive gear 36. Part 16 is the reflecting surface. Part 46 is the reflecting surface stabilizer and aligner and support. Part 26 is the pinion gear for axis 32. Part 26 includes an underlying support. Drive 28 (for the axis 32) includes a box like exterior cover. The "bottom end" of the post 20 (the end of the post 20 distal from the cover 100) may include a thruster 300 to maintain altitude and overall alignment. Such distal end of the post 20 may also include a gyroscope stabilizer 302. Part 20 is the post or support for the central pivot 22. Part 27 is a stabilizing guy wire.

FIG. 2 is a close up of the adjustment workings with the drive 28 for the axis 32 adjustment exposed.

The thrusts of my invention include:
multiple use of one reflecting array as opposed to single use parabolic reflectors;
hinge pivot via sphere at surface of reflector as opposed to gimbals
two axis single pivot inputs (via a single spherical input) where such inputs are spaced 90 degrees apart;
two axis single pivot inputs not spaced 90 degrees apart for special applications;
independently controlled and aimable reflectors;
large spaces between reflectors in an array thus limiting the focal length hot spot distance that is heated without limiting the distance at which the focal length hot spot is placed;
reflector arrays to be used to raise temperature in increments in enclosed smelters with vacuum pumps to collect vapors;
electromagnets for vapor collection both from enclosed smelters and collection canisters and on the (lunar) surface;
centrifugally functioning smelters to separate via specific gravity molten material into sections of the smelter;
tiltable centrifugally functioning smelters.

As indicated above, the reflectors 10 are spaced to be preferably between about one to about 100 miles apart, more preferably between about five to about 50 miles apart, and even more preferably about five to about 20 miles apart, and most preferably about ten miles apart. However, if desired, the reflectors 10 may be adjacent to each other (within inches or feet to up to a mile). Further, if desired, the reflectors 10 may be more than 100 miles apart. For example, for targeting asteroids, the reflectors 10 are preferred to be closed together, such as an inch apart. This provides a relatively long hot spot or relatively long focal length for a better chance of hitting the asteroid. On the other hand, for targeting locations on Earth or in the atmosphere of the Earth, the reflectors 10 may be spaced one mile to one hundred miles or more apart to provide a shaper focus to the hot spot.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

I claim:

1. A method for reflecting radiation emanating from a source, comprising the steps of:

a) providing at least first and second reflectors, with each of the reflectors comprising a planar surface for reflecting radiation emanating from the source, with each of the reflectors further comprising a first axis about which said reflector is rotatable and a second axis about which the reflector is rotatable, with said planar surface of each of said reflectors being circular with a periphery, with the step of providing at least first and second reflectors including the step of selecting a joint for each of the reflectors and a position for said joint, with said joint disposed on said periphery of said planar surface of each of the reflectors and including a center that lies in a plane of said planar surface for reflecting radiation, with said joint of each of the reflectors comprising a spherical input pivot;

b) placing the first and second reflectors into position;

c) orienting the first reflector such that radiation from the source is reflected to a location; and d) orienting the second reflector such that radiation from the source is reflected to said location so as to form a focus location wherein the first and second reflectors focus on said focus location;

e) with said steps of orienting said reflectors comprising, for each of the first and second reflectors, the step of applying a first input force upon the spherical input pivot of said joint of each of said reflectors that rotates said reflectors about each of the first and second axis, with the first input force causing said reflectors to rotate about one of the first and second axis; and f) with said steps of orienting said reflectors comprising, for each of the first and second reflectors, the step of applying a second input force upon said spherical input pivot of said joint of each of said reflectors to cause said reflectors to rotate about the other of the first and second axis whereby mathematical calculations for positioning said reflectors are simplified.

2. The method according to claim 1, wherein the joint is generally on one of the first and second axis.

3. The method according to claim 1, wherein positions of the reflectors are continuously adjustable.

4. The method according to claim 1, and further comprising an array of reflectors, with the first and second reflectors being in the array of reflectors.

5. The method according to claim 1, and further comprising a first array of reflectors and a second array of reflectors, with the first reflector being in the first array of reflectors arid with the second reflector being in the second array of reflectors.

6. The method according to claim 1, and further comprising a plurality of arrays of reflectors, wherein said focus location may be increased in size, and wherein size includes height, width and depth of said focus location whereby said focus location may be a long three-dimensional focus location.

7. The method according to claim 6, wherein one or more reflectors focus on a first focus location and wherein one or more of other reflectors focus on a second focus location.

8. The method according to claim 6, wherein one or more reflectors focus on a first focus sub-location and wherein one or more of other reflectors focus on a second focus sub-location, with the first and second focus sub-locations confronting each other whereby a height, width and depth of said focus location may be defined.

9. The method according to claim 6, wherein the reflectors from the plurality of arrays of reflectors create a radiation energy gradient such that portions of the focus location have a lesser concentration of radiation energy and that other portions of the focus location have a greater concentration of radiation energy.

10. The method according to claim 1, wherein said second axis is generally perpendicular to the first axis.

11. The method according to claim 1, and further comprising the step of directing said radiation through a filter.

12. The method of claim 1 wherein each of said reflectors pivots about a general center point of said respective reflector.

13. The method of claim 1 wherein said focus location is a moving focus location.

14. The method of claim 1 wherein said focus location is a stationary focus location.

15. A method for reflecting radiation emanating from a source, comprising the steps of:

a) providing a reflector, with the reflector comprising a planar surface for reflecting radiation emanating from the source, with the reflector comprising a first axis about which said reflector is rotatable, with the reflector comprising a second axis about which the reflector is rotatable, with said planar surface for reflecting being circular with a periphery, with the step of providing a reflector including the step of selecting a joint for the reflector and a position for said joint, with said joint disposed on said periphery of said planar surface and including a center that lies in a plane of said planar surface for reflecting radiation, with said joint comprising a spherical input pivot;

b) orienting the reflector such that radiation from the source is reflected to a location;

c) with said step of orienting the reflector comprising the step of applying a first input force upon said spherical input pivot of said joint that rotates the reflector about each of the first and second axis, with the first input force causing the reflector to rotate about one of the first and second axis; and d) with said step of orienting the reflector comprising the step of applying a second input force upon said spherical input pivot of said joint to cause the reflector to rotate about the other of the first and second axis whereby mathematical calculations for positioning the reflector are simplified.

16. The method of claim 15 wherein the joint is generally on one of the first and second axis.

17. The method of claim 15 wherein the first axis is generally perpendicular to the second axis.

18. The method of claim 15 wherein the reflector pivots about a general center point of the reflector.

* * * * *